(12) United States Patent
Allison (10) Patent No.: US 10,620,048 B2
(45) Date of Patent: Apr. 14, 2020

(54) APPARATUS AND METHOD FOR CAVITY-ENHANCED ULTRAFAST TWO-DIMENSIONAL SPECTROSCOPY

(71) Applicant: The Research Foundation for The State University of New York, Albany, NY (US)

(72) Inventor: Thomas K. Allison, Stony Brook, NY (US)

(73) Assignee: The Research Foundation for The State University of New York, Albany, NY (US)

(*) Notice: Subject to any disclaimer, the term of this patent is extended or adjusted under 35 U.S.C. 154(b) by 0 days.

(21) Appl. No.: 16/316,404

(22) PCT Filed: Aug. 24, 2017

(86) PCT No.: PCT/US2017/048344
§ 371 (c)(1),
(2) Date: Jan. 9, 2019

(87) PCT Pub. No.: WO2018/039417
PCT Pub. Date: Mar. 1, 2018

(65) Prior Publication Data
US 2019/0301933 A1 Oct. 3, 2019

Related U.S. Application Data

(60) Provisional application No. 62/378,779, filed on Aug. 24, 2016.

(51) Int. Cl.
*G01J 3/44* (2006.01)
*G01J 3/10* (2006.01)
(Continued)

(52) U.S. Cl.
CPC . *G01J 3/10* (2013.01); *G01J 3/02* (2013.01); *G01J 3/26* (2013.01); *G01J 3/28* (2013.01);
(Continued)

(58) Field of Classification Search
CPC ........ G01N 21/17; G01N 21/41; G01N 21/25; G01N 21/31; G01N 21/636; G01J 3/42;
(Continued)

(56) References Cited

U.S. PATENT DOCUMENTS 7,271,592 B1  9/2007 Gerald, II et al.
7,538,881 B2  5/2009 Ye et al.
(Continued)

OTHER PUBLICATIONS

PCT/ISA/237 Written Opinion issued on PCT/US2017/048344, pp. 9.

(Continued)

*Primary Examiner* — Abdullahi Nur
(74) *Attorney, Agent, or Firm* — The Farrell Law Firm, P.C.; John F. Gallagher, III (57) ABSTRACT

Provided are an apparatus and method for two-dimensional spectroscopy using frequency combs and optical resonators, with the apparatus including at least one cavity and a controller for controlling generating a pump excitation using at least two frequency combs, generating a probe excitation using at least one frequency comb, and generating a resonantly enhanced signal frequency comb via a nonlinear-optical response of the sample. All frequency combs are resonant with a transverse mode of the cavity, to generate cavity-enhanced two-dimensional spectroscopy signals.

18 Claims, 6 Drawing Sheets

(51) Int. Cl.
*G01J 3/26* (2006.01)
*G01J 3/45* (2006.01)
*G01N 21/63* (2006.01)
*G01J 3/02* (2006.01)
*G01J 3/28* (2006.01)

(52) U.S. Cl.
CPC .............. *G01J 3/45* (2013.01); *G01N 21/636* (2013.01); *G01J 2003/262* (2013.01)

(58) Field of Classification Search
CPC ........ G01J 3/10; G01J 3/26; G01J 3/45; G01J 2003/262
See application file for complete search history.

(56) References Cited

U.S. PATENT DOCUMENTS

| | | |
|---|---|---|
| 9,207,121 B2 | 12/2015 | Adler |
| 9,653,877 B1 * | 5/2017 | Arissian ................ G01N 21/41 |
| 2005/0254535 A1 | 11/2005 | Loewen et al. |
| 2008/0179528 A1 | 7/2008 | Demers |
| 2009/0237666 A1 | 9/2009 | Vollmer et al. |
| 2015/0138558 A1 | 5/2015 | Kachanov et al. |
| 2015/0276481 A1 | 10/2015 | Liu et al. |
| 2016/0313233 A1 * | 10/2016 | Zangmeister ...... G01N 21/1702 |

OTHER PUBLICATIONS

PCT/ISA/210 Search Report issued on PCT/US2017/048344, pp. 3.
Reber, Melanie A. R. et al., Cavity-enhanced ultrafast spectroscopy: ultrafast meets ultrasensitive, . . . Journal Copyright 2016 Optical Society of America, vol. 3, No. 3, Mar. 2016, Optica, pp. 311-317.
Greetham, Gregory M. et al., Waveguide-enhanced 2D-IR spectroscopy in the gas phase, Copyright 2013 Optical Society of America . . . Optics Letters, vol. 38, No. 18, Sep. 15, 2013, pp. 3596-3599.
Adler, Florian et al., Cavity-Enhanced Direct Frequency Comb Spectroscopy: Technology and Applications, Copyright 2010 by Annual Reviews, . . . Annual Review of Analytical Chemistry Mar. 2010, pp. 175-205.

* cited by examiner

APPARATUS AND METHOD FOR CAVITY-ENHANCED ULTRAFAST TWO-DIMENSIONAL SPECTROSCOPY

PRIORITY

This application claims priority to U.S. Provisional Patent Application No. 62/378,779 filed on Aug. 24, 2016, the contents of which are incorporated herein by reference.

GOVERNMENT SUPPORT

This invention was made with government support under grant number CHE1404296 awarded by the National Science Foundation and grant number FA9550-16-1-0164 by the Air Force Office of Scientific Research. The government has certain rights in the invention.

BACKGROUND

1. Field of the Invention

The present invention relates generally to optical spectroscopy and, more particularly, to an apparatus for cavity-enhanced ultrafast two-dimensional spectroscopy, and a method for operation of same.

2. Description of the Related Art

The detection and characterization of molecules using electromagnetic waves lies at the core of many important technological tools. For example, nuclear magnetic resonance (NMR) spectroscopy, in which the nuclei of materials are excited and probed by radio waves, is arguably one of the most successful technologies of the 20th century. NMR spectrometers enable discovery in university chemistry departments, major pharmaceutical companies, industrial chemical companies, and hospitals in the form of magnetic resonance imaging (MRI) machines.

The vibrations of molecules interact much more strongly with infrared radiation than the nuclei do with radio waves, and infrared spectrometers can thus acquire data much more rapidly and with much higher sensitivity than NMR. Infrared spectrometers are also smaller, more portable, and much less expensive than NMR machines. Thus, infrared spectroscopy is used in many contexts for both scientific research and real-world applications. Compact and sensitive infrared spectrometers are fielded in a diverse set of applications such as trace gas analysis, semiconductor processing, breath analysis, explosives and narcotics detection, and atmospheric chemistry studies.

However, the level of detail that conventional infrared spectroscopy can glean from a sample is in general far less than that of NMR, and NMR remains the gold standard for determining the structure of molecules. The success of NMR spectroscopy is due to the long coherence time of nuclear spin excitations, which persist even in the cluttered environment of a liquid or solid. With long spin lifetimes, a spectroscopist has great opportunity to manipulate spins in intricate ways, and record multidimensional NMR spectra which report directly on the couplings between the nuclei of a molecule or a material. By mapping which nuclei are coupled to which other nuclei, structures are determined with high accuracy.

Researchers have attempted to apply the principles of multidimensional spectroscopy to the infrared, developing two-dimensional infrared spectroscopy (2DIR). In principle, the functional groups of a molecule have coupled vibrations analogous to the coupled nuclear spins, and thus by recording the couplings with sufficient fidelity, one can use 2DIR spectroscopy to determine structure. However, while 2DIR spectroscopy has been applied to vibrational dynamics, and in some cases gross structure determination, the reach and impact of the technique has been nowhere near that of NMR or even standard linear infrared spectroscopy. A problem exists that vibrational coherences of molecules in solution are short-lived, such that 2DIR spectral features are broad and the opportunity for manipulations of coherent vibrational excitations is limited. In contrast, in dilute gasses, even large molecules can have very long-lived vibrational states that enable coherent manipulation, but the sensitivity of conventional 2DIR spectrometers is not sufficiently high to work with dilute samples. A previous attempt to record 2DIR spectra from gas phase samples was limited to a low-resolution demonstration in a heated waveguide [1].

In addition to the structure determination problem discussed above, the low sensitivity of all-optical ultrafast spectroscopy in general limits its application to samples of relatively high optical densities. This precludes the application of ultrafast multidimensional spectroscopy to many problems in optical spectroscopy. For example, while fundamental insights have been gained from linear spectroscopic studies on small gas-phase clusters [2-11], nonlinear (ultrafast) spectroscopy could allow experimenters to follow the flow of vibrational energy in these systems directly in the time domain. While experimenters have gained exquisite control over gas-phase molecular samples, for example assembling liquids "one molecule at a time" [5], the optical spectroscopy that can be performed on these gas-phase systems is in general much less sophisticated than is possible for solution phase studies in optically thick samples, and recording 2DIR spectra from these gas-phase "designer" molecules is not currently possible.

Another important problem is optical trace gas detection, currently served by cavity-enhanced linear spectroscopy [12]. In trace gas detection applications involving complex mixtures of gasses, the overlapping linear spectra of the gasses can complicate analysis. Some examples are flame diagnostics [13], breath analysis [14], and explosives and narcotics detection. Applying multidimensional spectroscopy to these mixtures could help isolate their different components with higher fidelity, but the sensitivity of conventional multidimensional spectrometers is not currently high enough to record signals from dilute gasses.

For characterizing surfaces, surface sum-frequency generation (SFG) is widely used for studying molecules at surfaces and interfaces, but this technique typically requires coverages on the order of one monolayer [15] or more, which is often insufficient for studying many catalytic or electrochemical surfaces under their typical working conditions. Applying sensitive nonlinear spectroscopy to these surfaces could be used for in-situ analysis of chemistry at sparsely covered surfaces, but the sensitivity of conventional multidimensional spectrometers is not high enough to record signals from sparsely covered surfaces.

SUMMARY OF THE INVENTION

To resolve the drawbacks and disadvantages of conventional systems, the present disclosure provides a method of multidimensional spectroscopy that uses frequency combs and optical resonators for recording 2D ultrafast spectroscopy signals with high sensitivity, extending ultrafast multidimensional spectroscopy to very dilute samples and qualitatively new applications. The methods are applicable to any spectral region where frequency combs and high-finesse cavity optics can be fabricated, currently the near UV, visible, and infrared. The high sensitivity is obtained by resonantly enhancing pump, probe, and generated signal pulses in optical cavities, "cavity-enhancing" the nonlinear spectroscopy signals from a dilute sample, referred to as cavity-enhanced 2D (CE-2D) spectroscopy.

An aspect of the present disclosure provides an apparatus for 2D spectroscopy that includes at least one cavity configured to contain a sample and a controller that controls a pump excitation using at least two frequency combs resonantly enhanced in at least one transverse mode of the at least one cavity, a probe excitation using at least one frequency comb resonantly enhanced in at least one transverse mode of the at least one cavity, and generating a resonantly enhanced signal frequency comb via a nonlinear-optical response of the sample.

Another aspect of the present disclosure provides an apparatus for optical spectroscopy that includes at least two cavities and a controller that controls a pump excitation using at least two frequency combs resonantly enhanced in at least one transverse mode of a pump cavity of the at least two cavities, a probe excitation using at least one frequency comb resonantly enhanced in at least one transverse mode of a probe cavity of the at least two cavities, and generating a resonantly enhanced signal frequency comb via a nonlinear-optical response of the sample.

A further aspect of the present disclosure provides a method that includes generating a pump excitation using at least two frequency combs, generating a probe excitation using at least one frequency comb, and generating resonantly enhanced signal frequency combs via a nonlinear optical response of a sample, with the at least two pump frequency combs and the at least one probe frequency being resonant with at least one transverse mode of at least one cavity in which a sample is positioned for performing 2D spectroscopy.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION

Embodiments of the present disclosure are described in detail with reference to the accompanying drawings. Detailed descriptions of constructions or processes known in the art may be omitted to avoid obscuring the subject matter of the present disclosure. Further, in the following description of the present disclosure, various specific definitions found in the following description are provided to give a general understanding of the present disclosure, and it is apparent to those skilled in the art that the present disclosure can be implemented without such definitions.

Provided is an improved method of ultrasensitive detection of nonlinear-optical spectroscopy signals from dilute samples, such as dilute gasses, sparsely covered surfaces, or solutions with ultra-low concentration. The enabling technology is a combination of frequency comb lasers and high-finesse optical resonators, or "femtosecond enhancement cavities" (fsEC). By carefully matching the repetition rate and phase evolution of pulses from a frequency comb with that of the pulse in the fsEC, femtosecond pulses can be coherently added and passively amplified [16-18]. Using the comb as a "million stable lasers at once" [19], this technology was conventionally applied to linear spectroscopy, focusing mostly on the application of trace gas detection (see U.S. Pat. No. 7,538,881 to Ye and [20]). However, the enormous potential for femtosecond time-resolved measurements had not been explored. In previous work, the inventor demonstrated the first cavity-enhancement of ultrafast spectroscopy signals [21], performing a transient absorption experiment in a dilute molecular iodine sample.

The present disclosure goes beyond transient absorption to measure multidimensional spectroscopy [22] signals using the phase cycling of multiple fsEC-enhanced frequency combs.

Figure 1:
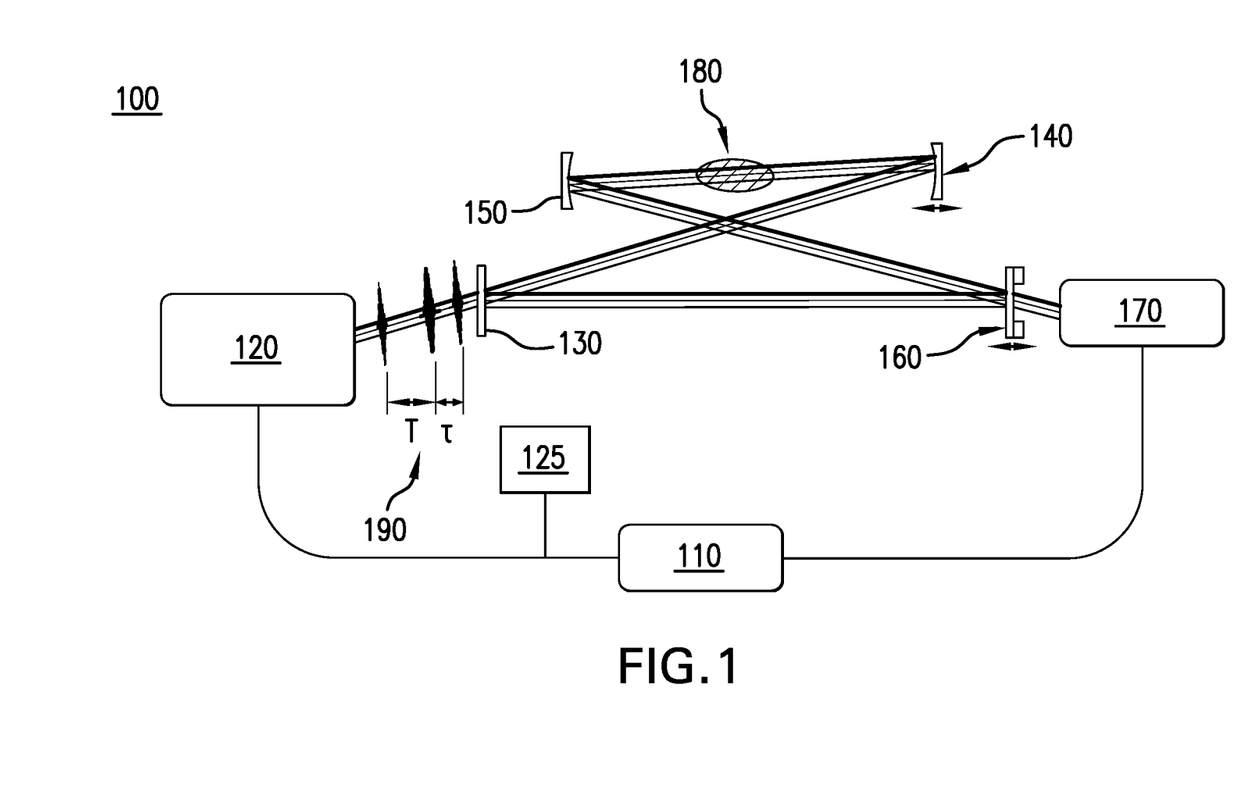
FIG. 1 illustrates a single cavity apparatus for CE-2D spectroscopy according to the present disclosure.

FIG. 1 illustrates a single cavity apparatus 100 for CE-2D spectroscopy according to the present disclosure. As shown in FIG. 1, the single cavity apparatus 100 includes a controller 110, a frequency comb generator 125, an interferometer 120, a ring cavity consisting of at least four mirrors 130, 140, 150, and 160, and a signal isolating spectrometer 170. The cavity can be filled with sample gas, or a sample can be introduced at a cavity focus 180. The resonantly enhanced, circulating pump and probe frequency combs generate a resonantly enhanced signal frequency comb via the nonlinear optical response of the sample.

The multiple required frequency combs with adjustable delay and independent carrier-envelope offset frequencies can be generated using one frequency comb light source (e.g. a mode-locked laser) and the interferometer 120, which includes at least one acousto-optic modulator (AOM) configured to generate the additional frequency combs. Alternatively, multiple phase-locked frequency comb sources with independent repetition rates can be used, as in dual comb techniques [23] for linear spectroscopy, at added cost and complexity. Either way, the three frequency combs coupled to distinct higher-order transverse or longitudinal modes of the cavity with distinct carrier-envelope offset frequencies. A resonantly-enhanced 2D spectroscopy signal is generated upon satisfying a resonance condition as illustrated in FIG. 2, which illustrates a comb/cavity resonance scheme in a one-cavity CE-2D spectroscopy scheme according to the present disclosure, as discussed below.

The single cavity apparatus includes at least one cavity that is configured to contain a sample and a controller 110 that controls a pump excitation using at least two frequency combs resonantly enhanced in at least one transverse mode of the at least one cavity. Controller 110 also controls a probe excitation using at least one frequency comb resonantly enhanced in at least one transverse mode of the at least one cavity and the generating of a resonantly enhanced signal frequency comb via a nonlinear-optical response of the sample. The pump pulses and the probe pulses circulate about the at least one cavity to acquire intracavity round trip phase shifts, which are based on differing carrier envelope offset frequencies of the at least two frequency combs of the pump excitation, and the intracavity round trip phase shifts are based on a round trip Gouy phase of an Hermite-Gaussian mode. A combination of spatial mode discrimination, frequency discrimination, and temporal discrimination suppresses undesired signals from a 2D spectroscopy signal, and the 2D spectroscopy signal can be isolated using heterodyne detection with a local oscillator comb.

The single cavity apparatus 100 provides simplified alignment and laser/cavity stabilization, and allows for use of an extended sample, as would be produced by filling the cavity with sample gas or using a slit supersonic expansion. By choosing the symmetry of the excited cavity modes and tuning the resonance frequencies, the spectroscopist can select what signals are resonantly enhanced and suppress background.

Figure 2:
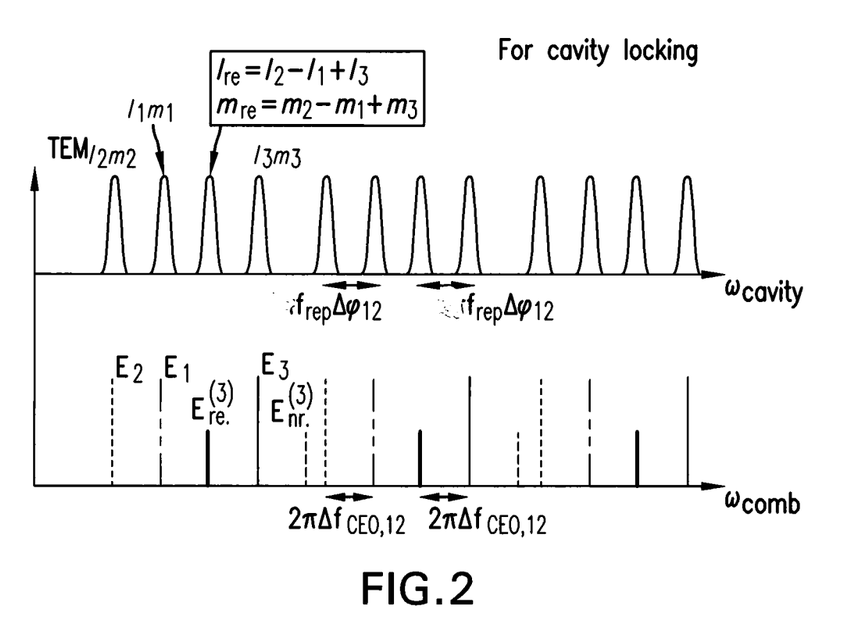
FIG. 2 illustrates a comb/cavity resonance scheme in a one-cavity CE-2D spectroscopy scheme according to the present disclosure.

FIG. 2 illustrates a rephasing signal that is resonantly enhanced and a non-rephasing signal that is suppressed. In the example provided in FIG. 2, the non-rephasing signal can be recorded by reversing the time-ordering of the two pump frequency combs $E_1$ and $E_2$.

Figure 3:
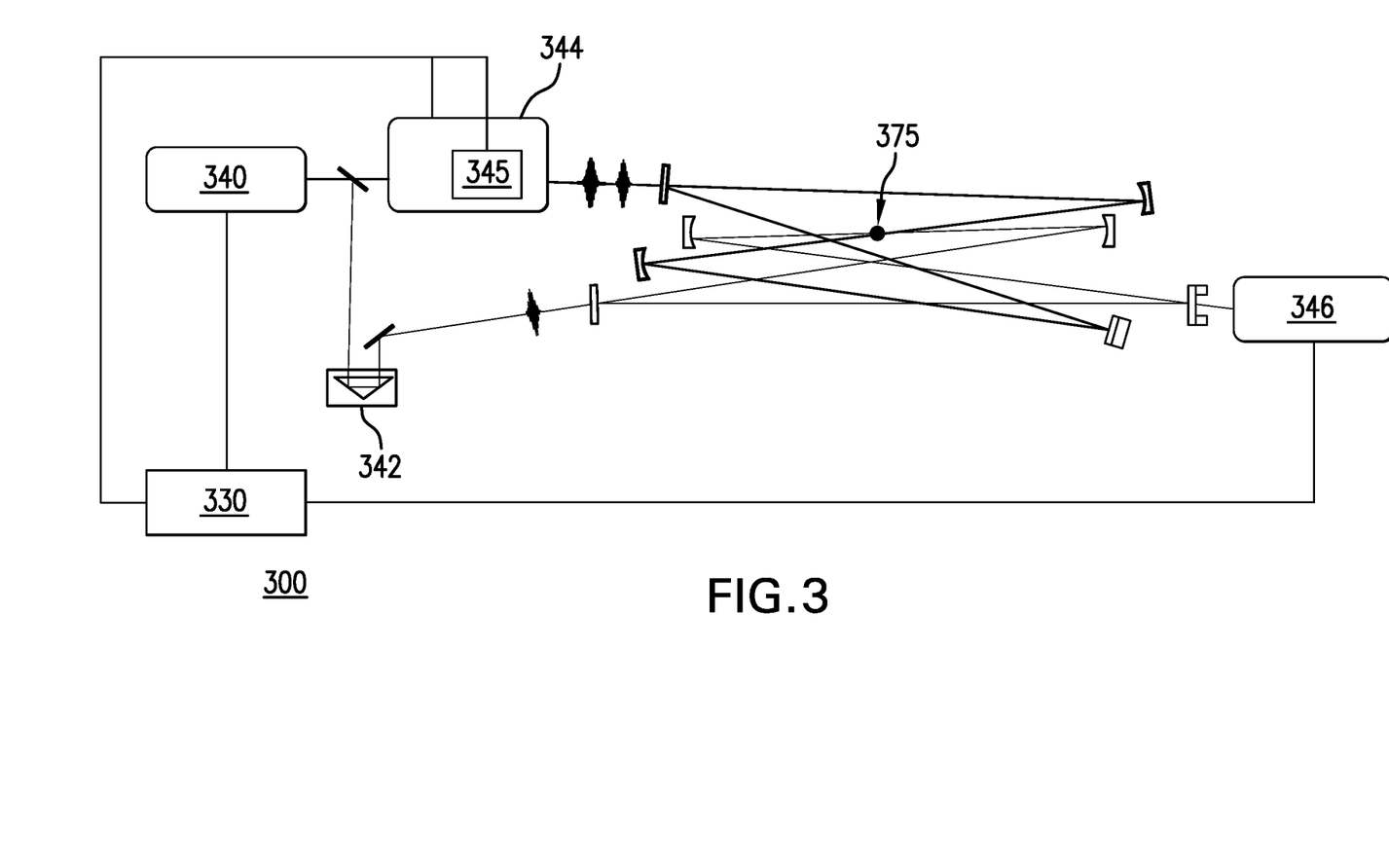
FIG. 3 illustrates a two-cavity apparatus for CE-2D spectroscopy according to the present disclosure.
Figure 4:
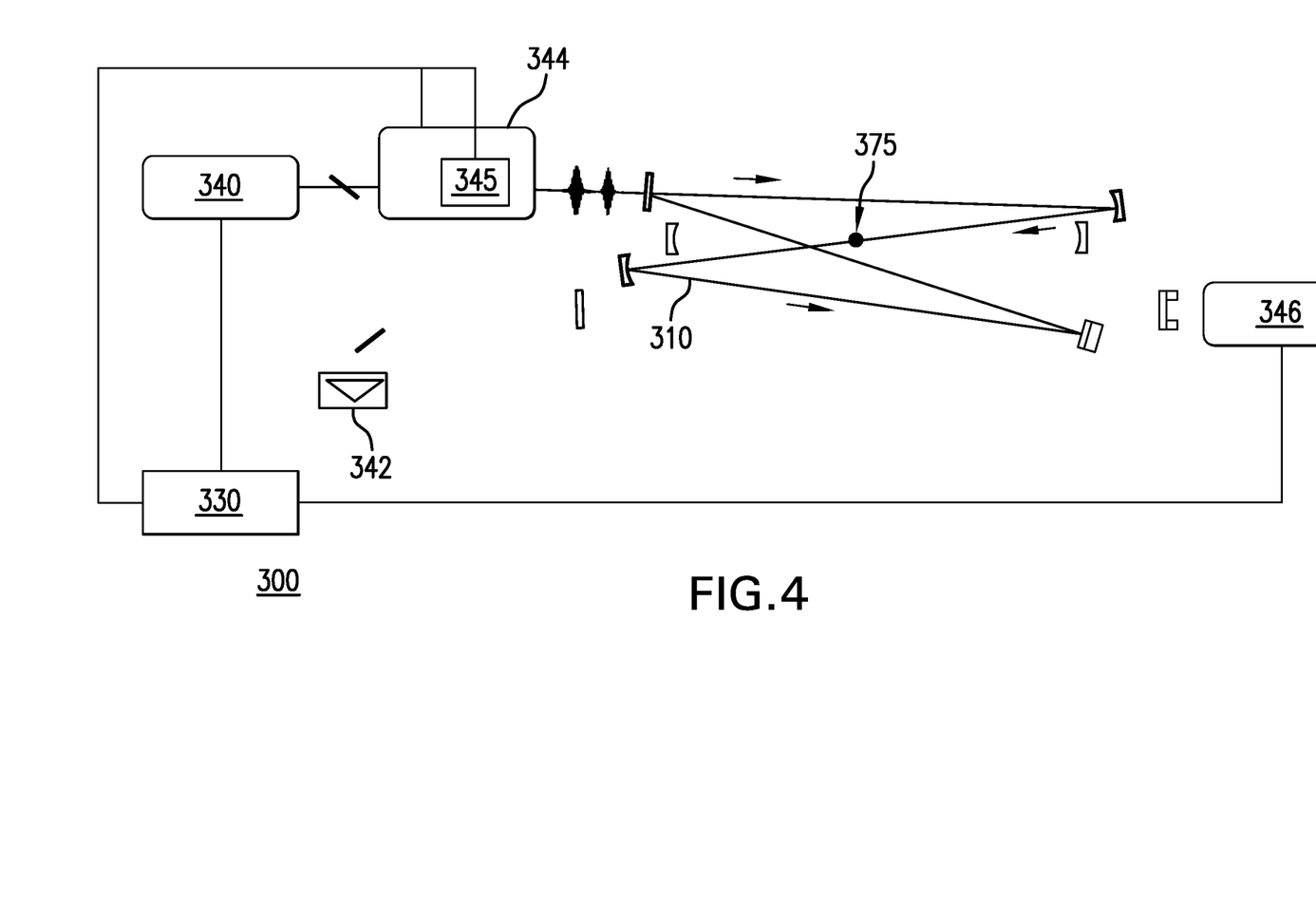
FIG. 4 illustrates a path of pump femtosecond pulses in a two-cavity CE-2D spectroscopy scheme according to the present disclosure.

Using higher-order $TEM_{lm}$ modes of the cavity provides greater opportunities for enhancing a particular desired 2D spectroscopy and suppressing background signals than using the lowest order $TEM_{00}$ mode alone. Phase cycling using higher-order modes utilizes the mode structure of optical resonators. In an optical cavity, light pulses in different spatial modes acquire a round trip differential phase shift due to the dependence of the round-trip Gouy phase on the Hermite-Gaussian mode. In general, if $E_1$ is in the $TEM_{l1m1}$ mode and $E_2$ is in the $TEM_{l2m2}$ mode, in each round trip they acquire a relative phase shift of Equation (1):

$$\Delta\phi_{12|round\ trip} = (l_1 - l_2)\psi_{tan} + (m_1 - m_2)\psi_{sag} \quad (1)$$

with the Gouy phase shifts $\psi_{tan}$ and $\psi_{sag}$ solely determined by the geometry of the cavity, related to the components of the ABCD matrices via $\psi = sgn(B) \cos^{-1}[(A+D)/2]$, with separate ABCD matrices for the sagittal and tangential planes, respectively. These phase shifts are tunable by changing the cavity geometry. For example, in the ring cavities of FIGS. 1, 3 and 4, the phase shifts are continuously tunable from $-\pi$ to 0 by changing the curved mirror separation. Since the Gouy phase shift depends only on the cavity geometry and is independent of wavelength, it corresponds to a pure carrier-envelope offset frequency shift, viz. Equation (2):

$$f_{CEO,1} - f_{CEO,2} = \frac{f_{rep}}{2\pi}\Delta\phi_{12}|_{roundtrip} \quad (2)$$

Thus, coupling combs to the higher-order modes of an optical cavity causes phase cycling, and new combs are generated that can also be made resonant. As discussed below, mode-matching also provides spatial isolation of the signal analogous to non-collinear phase matching in conventional 2D spectrometers.

Figure 6:
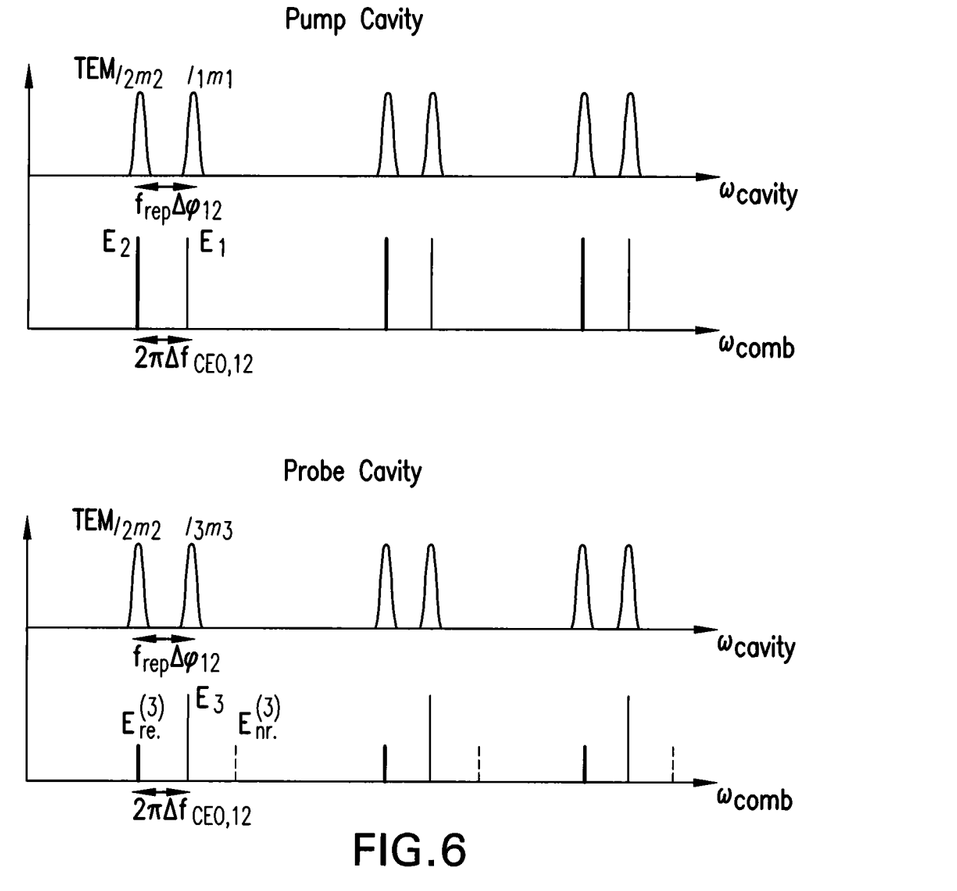
FIG. 6 illustrates the resonant enhancement of pump, probe and signal frequency combs in the two-cavity CE-2D scheme according to the present disclosure.

For conciseness, the present disclosure is based on bow-tie ring cavities, which allow independent control of the overall cavity length and focus size, though the present disclosure is not so limited. Ring cavities provide separate control of the peak intensity at the sample and the repetition rate of the system, and allow for easy introduction of counter-propagating reference beams for common-mode noise subtraction, as has been critical for the success of CE-TAS [21]. FIGS. 1 and 3 show physical implementations of cavity-enhanced 2D spectroscopy using one and two ring cavities that generate signals that are background-free in the sense that the signal field is generated in an unoccupied cavity mode. The frequency domain resonance conditions using the cavity's higher order modes are illustrated in FIGS. 2 and 6.

Hermite-Gaussian spatial modes of a ring cavity with normalized field amplitudes are described mathematically at the beam waist (intracavity focus) via Equation (3):

$$u_{lm}(x, y) = \left(\frac{2}{\pi}\right)^{1/2} \sqrt{\frac{1}{2^{(l+m)} w_{0x} l! \, w_{0y} m!}} H_l\left(\frac{\sqrt{2}x}{w_{0x}}\right) H_m\left(\frac{\sqrt{2}y}{w_{0y}}\right) e^{-x^2/w_{0x}^2} e^{-y^2/w_{0y}^2}, \quad (3)$$

where l and m are the mode orders in the tangential (x) and sagittal (y) planes, respectively, $H_l$ is the $l^{th}$ order Hermite polynomial, and $w_{0x}$ and $w_{0y}$ are the $1/e^2$ intensity radii of the fundamental $TEM_{00}$ mode in the x and y directions [24]. In a ring cavity with spherical mirrors, astigmatism causes $w_{0x} \neq w_{0y}$, which breaks the degeneracy between horizontal and vertical modes via their different round-trip Gouy phase shifts, described by Equation (1).

To resonantly enhance a desired 2D signal, the generated signal comb must be resonant with one or more of the cavity's transverse modes. In the single cavity scheme of FIGS. 1 and 2, three collinear frequency combs with different $f_{CEO}$'s are coupled to three different transverse modes. There exists at least one set of integers $l_t$ and $m_t$ for the target modes that satisfy Equations (4) and (5):

$$f_{CEO}^{(3)} = \mp f_{CEO,1} \pm f_{CEO,2} + f_{CEO,3} = \mp f_{rep}\frac{\Delta\phi_{12}}{2\pi} + f_{CEO,3} \quad (4)$$

$$l_t\psi_{tan} + m_t\psi_{sag} = (\mp l_1 \pm l_2 + l_3)\psi_{tan} + (\mp m_1 \pm m_2 + m_3)\psi_{sag} \quad (5)$$

In Equations (4) and (5), the upper sign corresponds to the rephasing signal, and the lower sign corresponds to the non-rephasing signal. This can be satisfied via Equations (6) and (7):

$$l_t = \mp l_1 \pm l_2 + l_3 \quad (6)$$

$$m_t = \mp m_1 \pm m_2 + m_3, \quad (7)$$

as illustrated in FIG. 2, but can also be satisfied in other ways, particularly when either $2\pi/\psi_{tan}$ or $2\pi/\psi_{sag}$ are integers and several modes are degenerate. For example, with $E_1$ in the $TEM_{10}$ mode, $E_2$ in the $TEM_{11}$ mode, $E_3$ in the $TEM_{00}$ mode, the rephasing signal is clearly resonant with the $TEM_{01}$ mode since $-l_1+l_2+l_3=0$ and $-m_1+m_2+m_3=1$. In contrast, the simple arithmetic for the non-rephasing signal gives $(l_t, m_t) = (0, -1)$, and there is no $TEM_{0-1}$ mode, and it appears that this signal is not resonant. However, if for example $\psi_{sag} = -\pi/2$, the non-rephasing signal is resonant with the $TEM_{03}$ mode, which also has the appropriate even-x, odd-y symmetry to accept the signal.

Only the spatial component of the generated field that is mode-matched to the target cavity mode will be resonantly enhanced. The spatial overlap factor $\langle u_t | u^{(3)} \rangle$ between the generated $E^{(3)}$ comb, with normalized spatial mode amplitude $u^{(3)}$ and the target resonant $TEM_{l_t m_t}$ mode, with normalized spatial amplitude $u_t$, is given by Equation (8):

$$\langle u_t | u^{(3)} \rangle = \frac{\int dx \int dy\, u_t^* u_{l_1 m_1} u_{l_2 m_2} u_{l_3 m_3}}{\int dx \int dy\, u_{l_1 m_1}^* u_{l_2 m_2}^* u_{l_3 m_3}^* u_{l_1 m_1} u_{l_2 m_2} u_{l_3 m_3}}, \quad (8)$$

where the $u_{lm}$ are defined by Equation (3). With heterodyne detection, the fundamental shot-noise limit on the signal to noise scales also then scales as $$|\langle u_t | u^{(3)} \rangle| \left(\frac{\mathcal{F}}{\pi}\right)^2.$$

The spatial-mode selectivity of the cavity via Equation (8) is analogous to phase matching in conventional 2D spectroscopy setups. Akin to isolation of a desired signal in a boxcar geometry by detecting in a certain direction, use of higher-order modes in CE-2D spectroscopy allows for isolation of a desired signal by detecting in a certain spatial mode. The generation and resonant enhancement of CE-2D signals using higher order cavity modes can thus be viewed as selecting a desired third-order response signal through a combination of both phase cycling and spatial discrimination/phase matching. This combination makes CE-2D spectroscopy highly selective, even in the completely collinear geometry of FIG. 1, since both the cavity and the detection methods facilitate discrimination against undesired signals. For example, again considering the case where $E_1$, $E_2$, and $E_3$ are coupled into the $TEM_{10}$, $TEM_{11}$, and $TEM_{00}$ modes of one optical cavity, the rephasing signal is resonantly enhanced in the $TEM_{01}$ mode with a mode-matching factor $|\langle u_t | u^{(3)} \rangle| = 0.65$. Without mode degeneracy, the non-rephasing signal is not resonantly enhanced, and would instead be recorded by reversing the time-ordering of $E_1$ and $E_2$. Undesired signals, although emitted collinearly, are suppressed from the target mode via a combination of the spatial and frequency discrimination. For example, the transient absorption signals $\propto |E_1|^2 E_3$ and $\propto |E_2|^2 E_3$ are enhanced in the $TEM_{00}$ mode occupied by $E_3$ but are generated with both the wrong frequency $$\left(f_{CEO}^{(3)} = f_{CEO,3} \neq f_{CEO,3} - \frac{f_{rep}}{2\pi} \Delta\phi_{12}|_{roundtrip}\right)$$

and the wrong spatial symmetry ($|\langle u_t | u^{(3)} \rangle| = 0$) to appear in the target $TEM_{01}$. Similarly, two quantum signals $\propto E_1 E_2 E_3^*$ are weakly resonant with the $TEM_{21}$ mode ($|\langle u_{21} | u^{(3)} \rangle| = 0.05$) but are suppressed from the target $TEM_{01}$ mode by frequency discrimination. Some fifth-order signals and cascaded third-order signals do satisfy the resonance and symmetry requirements necessary to be resonantly enhanced in the target mode, but can be distinguished via power and sample density dependence of the signal, as in conventional 2D spectroscopy. Using a cavity where some of the modes are degenerate provides additional opportunities, and can be done by tuning the curved mirror separation such that either $2\pi/\psi_{tan}$ or $2\pi/\psi_{sag}$ (or both) are integers.

In regards to physical implementations of the above-described resonantly enhanced phase-cycling, since $E_1$, $E_2$, and $E_3$ can share a common repetition rate and differ only by carrier envelope offset frequency, they can be generated from a single frequency comb generator (e.g. a mode-locked laser) by diffraction from fixed-frequency AOMs, without requiring three separate frequency comb generators. Alternatively, multiple phase-locked frequency comb sources with independent repetition rates can be used, as in dual comb techniques [23] for linear spectroscopy, at added cost and complexity. Cavity geometry and mode selection can depend on and be optimized based on system complexity, signal enhancement factor, signal specificity, ease of alignment, attainable sample length, and signal readout, based on demands of a particular measurement. Using a single cavity allows for simple configuration of the optical alignment and stabilization of the apparatus and system, and allows for a longer effective sample length where the pump and probe frequency comb beams spatially overlap, for an increased column density of molecules, but requires separation of the weak signal field from the intense collinear pump and probe fields.

Figure 5:
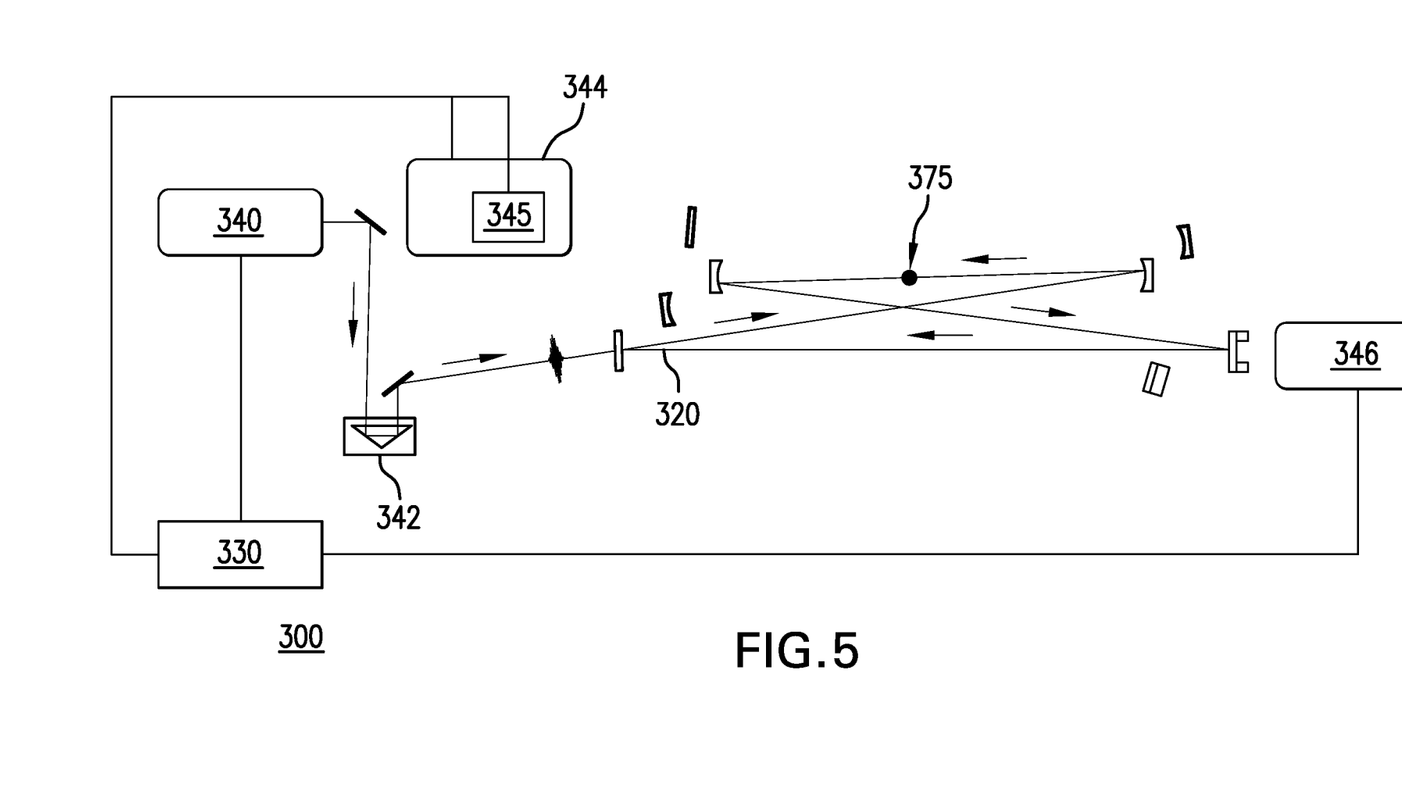
FIG. 5 illustrates a path of probe femtosecond pulses in the two-cavity CE-2D spectroscopy scheme according to the present disclosure.

The present disclosure also covers two-cavity schemes, illustrated in FIGS. 3-5. It is easier to isolate the CE-2D signal in the two-cavity scheme, but the optical setup is more complex and thus the alignment of the spectrometer more difficult.

FIG. 3 illustrates a two-cavity apparatus 300 for CE-2D spectroscopy. The two-cavity apparatus 300 performs passively amplified 2D spectroscopy in a sample at a common focus 375, which provides a point of overlap in a vacuum chamber of pump and probe excitation in the two cavities. An optical resonator is formed by each cavity, providing first and second fsECs that resonantly enhance pump and probe frequency combs, respectively. A controller 330 controls a frequency comb generator 340, controls an interferometer 344 that includes an AOM 345, and controls a lock-in spectrometer 346 to detect modulation on the light transmitted in the probe cavity. The waiting time T between the phase cycling pump pulses and the probe pulses is controlled by an external translation stage 342 separate from the stages in the interferometer 344.

FIG. 4 illustrates a path of pump femtosecond pulses 310 in a first cavity of a two-cavity CE-2D spectroscopy scheme. FIG. 5 illustrates a path of probe femtosecond pulses 320 in a second cavity of the two-cavity CE-2D spectroscopy scheme. FIG. 6 illustrates the resonant enhancement of pump and probe frequency combs in the two-cavity CE-2D scheme, with the rephasing signal being resonantly enhanced and the non-rephasing signal being suppressed.

This two-cavity optical arrangement is similar to a setup for cavity-enhanced ultrafast transient absorption spectroscopy previously demonstrated by the inventor in [21], but has the critical difference that with the multi-mode phase cycling pump excitation, the modulation on the probe light can be generated at a modulation frequency larger than the optical linewidths of the resonators. At these high frequencies, the probe cavity filters intensity and frequency noise of the transmitted comb light, such that much better noise rejection is achievable compared to [21]. Importantly, [21] did not record 2D spectroscopy signals.

Accordingly, an apparatus for optical spectroscopy is provided having at least two cavities and a controller that controls a pump excitation using at least two frequency combs resonantly enhanced in at least one transverse mode of a pump cavity of the at least two cavities, controls a probe excitation using at least one frequency comb resonantly enhanced in at least one transverse mode of a probe cavity of the at least two cavities, controls generating a resonantly enhanced signal frequency comb via a nonlinear-optical response of the sample, isolates a 2D spectroscopy signal in the non-collinear geometry by demodulating a signal that appears as an amplitude modulation on light transmitted in the probe cavity, and controls recording of the 2D spectroscopy signal using a lock-in demodulation of light transmitted in the probe cavity at a demodulation frequency of carrier-envelope offset differences of the at least two frequency combs of the pump excitation. The at least two cavities provide a non-collinear geometry, and a point of overlap of the pump excitation and the probe excitation is provided in the at least two cavities.

A method is also provided that includes generating a pump excitation using at least two frequency combs, generating a probe excitation using at least one frequency comb, and generating resonantly enhanced signal frequency combs via a nonlinear optical response of a sample, with the at least two pump frequency combs and the at least one probe frequency comb are resonant with at least one transverse mode of at least one cavity in which a sample is positioned for performing 2D spectroscopy, with the resonantly enhanced frequency combs enhancing the 2D spectroscopy of the sample, and the at least two pump frequency combs and the at least one probe frequency comb being coupled to at least one transverse mode of the at least one cavity.

While the disclosure has been shown and described with reference to certain embodiments thereof, it will be understood by those skilled in the art that various changes in form and detail may be made therein without departing from the spirit and scope of the invention as defined by the appended claims and equivalents thereof.

REFERENCES

[1] G. M. Greetham, I. P. Clark, D. Weidmann, M. N. R. Ashfold, A. J. Orr-Ewing, and M. Towrie, Opt. Lett. 38, 3596 (2013).
[2] K. L. Busarow, G. A. Blake, K. B. Laughlin, R. C. Cohen, Y. T. Lee, and R. J. Saykally, The Journal of Chemical Physics 89, 1268 (1988).
[3] K. L. Busarow, R. C. Cohen, G. A. Blake, K. B. Laughlin, Y. T. Lee, and R. J. Saykally, The Journal of Chemical Physics 90, 3937 (1989).
[4] A. J. Huneycutt, R. J. Stickland, F. Hellberg, and R. J. Saykally, The Journal of Chemical Physics 118, 1221 (2003).
[5] F. N. Keutsch and R. J. Saykally, Proceedings of the National Academy of Sciences 98, 10533 (2001).
[6] K. Liu, R. S. Fellers, M. R. Viant, R. P. McLaughlin, M. G. Brown, and R. J. Saykally, Review of Scientific Instruments 67, 410 (1996).
[7] J. B. Paul, C. P. Collier, R. J. Saykally, J. J. Scherer, and A. O'Keefe, The Journal of Physical Chemistry A 101, 5211 (1997).
[8] J. B. Paul, R. A. Provencal, C. Chapo, A. Petterson, and R. J. Saykally, The Journal of Chemical Physics 109, 10201 (1998).
[9] J. B. Paul, R. A. Provencal, C. Chapo, K. Roth, R. Casaes, and R. J. Saykally, The Journal of Physical Chemistry A 103, 2972 (1999).
[10] R. A. Provencal, J. B. Paul, K. Roth, C. Chapo, R. N. Casaes, R. J. Saykally, G. S. Tschumper, and H. F. Schaefer, The Journal of Chemical Physics 110, 4258 (1999).
[11] R. J. Saykally and D. J. Wales, Science 336, 814 (2012).
[12] *Cavity Enhanced Spectroscopy and Sensing* (Springer, 2013).
[13] J. J. Scherer, K. W. Aniolek, N. P. Cernansky, and D. J. Rakestraw, The Journal of Chemical Physics 107, 6196 (1997).
[14] A. Foltynowicz, P. Masłowski, A. J. Fleisher, B. J. Bjork, and J. Ye, Applied Physics B 110, 163 (2013).
[15] Y. R. Shen, Annual Review of Physical Chemistry 64, 129 (2013).
[16] R. J. Jones and J. Ye, Opt. Lett. 29, 2812 (2004).
[17] T. Gherman and D. Romanini, Opt. Express 10, 1033 (2002).
[18] R. J. Jones and J. Ye, Opt. Lett. 27, 1848 (2002).
[19] J. L. Hall, J. Ye, S. A. Diddams, L.-S. Ma, S. T. Cundiff, and D. J. Jones, Quantum Electronics, IEEE Journal of 37, 1482 (2001).
[20] F. Adler, M. J. Thorpe, K. C. Cossel, and J. Ye, Annual Review of Analytical Chemistry 3, 175 (2010).
[21] M. A. R. Reber, Y. Chen, and T. K. Allison, Optica 3, 311 (2016).
[22] M. T. Zanni, Proceedings of the National Academy of Sciences 113, 4890 (2016).
[23] I. Coddington, N. Newbury, and W. Swann, Optica 3, 414 (2016).
[24] A. E. Siegman, *Lasers* (University Science Books, 1986).

What is claimed is:

1. An apparatus for two-dimensional (2D) spectroscopy, the apparatus comprising:
    at least one cavity configured to contain a sample; and
    a controller configured to control
        a pump excitation using at least two frequency combs resonantly enhanced in at least one transverse mode of the at least one cavity,
        a probe excitation using at least one frequency comb resonantly enhanced in at least one transverse mode of the at least one cavity, and
        generating a resonantly enhanced signal frequency comb via a nonlinear-optical response of the sample,
    wherein pump pulses and probe pulses circulate about the at least one cavity to acquire intracavity round trip phase shifts.

2. The apparatus of claim 1 wherein the intracavity round trip phase shifts are based on differing carrier envelope offset frequencies of the at least two frequency combs of the pump excitation.

3. The apparatus of claim 1 wherein the intracavity round trip phase shifts are based on a round trip Gouy phase of an Hermite-Gaussian mode.

4. An apparatus for two-dimensional (2D) spectroscopy, the apparatus comprising:
    at least one cavity configured to contain a sample; and
    a controller configured to control
        a pump excitation using at least two frequency combs resonantly enhanced in at least one transverse mode of the at least one cavity,
        a probe excitation using at least one frequency comb resonantly enhanced in at least one transverse mode of the at least one cavity, and
        generating a resonantly enhanced signal frequency comb via a nonlinear-optical response of the sample,
    further comprising an interferometer that includes at least one acousto-optic modulator (AOM) configured to generate the at least two frequency combs of the pump excitation and the at least one frequency comb of the probe excitation.

5. The apparatus of claim 4, wherein cavity-enhanced 2D spectroscopy is performed using only one frequency comb generator, with additional phase-cycling frequency combs produced using the at least one AOM.

6. The apparatus of claim 5, wherein the frequency comb generator is a mode-locked laser.

7. An apparatus for two-dimensional (2D) spectroscopy, the apparatus comprising:
 at least one cavity configured to contain a sample; and
 a controller configured to control
  a pump excitation using at least two frequency combs resonantly enhanced in at least one transverse mode of the at least one cavity,
  a probe excitation using at least one frequency comb resonantly enhanced in at least one transverse mode of the at least one cavity, and
  generating a resonantly enhanced signal frequency comb via a nonlinear-optical response of the sample,
 wherein a combination of spatial mode discrimination, frequency discrimination, and temporal discrimination suppresses undesired signals from a 2D spectroscopy signal.

8. The apparatus of claim 7, wherein the 2D spectroscopy signal is isolated using heterodyne detection with a local oscillator comb.

9. An apparatus for performing optical spectroscopy, the apparatus comprising:
 at least two cavities; and
 a controller configured to control
  a pump excitation using at least two frequency combs resonantly enhanced in at least one transverse mode of a pump cavity of the at least two cavities,
  a probe excitation using at least one frequency comb resonantly enhanced in at least one transverse mode of a probe cavity of the at least two cavities, and
  generating a resonantly enhanced signal frequency comb via a nonlinear-optical response of the sample,
 further comprising at least one point of overlap of the pump excitation and the probe excitation in the at least two cavities.

10. An apparatus for performing optical spectroscopy, the apparatus comprising:
 at least two cavities; and
 a controller configured to control
  a pump excitation using at least two frequency combs resonantly enhanced in at least one transverse mode of a pump cavity of the at least two cavities,
  a probe excitation using at least one frequency comb resonantly enhanced in at least one transverse mode of a probe cavity of the at least two cavities, and
  generating a resonantly enhanced signal frequency comb via a nonlinear-optical response of the sample,
 wherein the at least two cavities provide a non-collinear geometry.

11. The apparatus of claim 10, wherein the controller is further configured to isolate a 2D spectroscopy signal in the non-collinear geometry by demodulating a signal that appears as an amplitude modulation on light transmitted in the probe cavity.

12. The apparatus of claim 11, wherein the controller is further configured to control recording of the 2D spectroscopy signal using demodulation of the light transmitted in the probe cavity at a demodulation frequency of carrier-envelope offset differences of the at least two frequency combs of the pump excitation.

13. A method for performing two-dimensional (2D) spectroscopy, comprising:
 generating a pump excitation using at least two frequency combs;
 generating a probe excitation using at least one frequency comb; and
 generating resonantly enhanced signal frequency combs via a nonlinear optical response of a sample,
 wherein the at least two pump frequency combs and the at least one probe frequency are resonant with at least one transverse mode of at least one cavity in which a sample is positioned for performing 2D spectroscopy.

14. The method of claim 13, wherein the resonantly enhanced signal frequency combs enhance the 2D spectroscopy of the sample.

15. The method of claim 13, wherein the at least two pump frequency combs and the at least one probe frequency comb are coupled to at least one transverse mode of the at least one cavity.

16. The method of claim 13, wherein probe pulses acquire phase shifts in each round trip of the at least one cavity, with the acquired phase shifts based on a round trip Gouy phase of an Hermite-Gaussian mode.

17. The method of claim 13, wherein circulating pump pulses acquire phase shifts in each round trip of the at least one cavity.

18. The method of claim 17, wherein the acquired phase shifts of the circulating pump pulses are based on a round trip Gouy phase of an Hermite-Gaussian mode.

* * * * *